(12) United States Patent
Lo (10) Patent No.: US 6,826,236 B2
(45) Date of Patent: Nov. 30, 2004

(54) MAXIMUM RATIO TRANSMISSION

(75) Inventor: Titus Lo, Redmond, WA (US)

(73) Assignee: AT&T Wireless, Redmond, WA (US)

( * ) Notice: Subject to any disclaimer, the term of this patent is extended or adjusted under 35 U.S.C. 154(b) by 0 days.

(21) Appl. No.: 10/177,461

(22) Filed: Jun. 19, 2002

(65) Prior Publication Data

US 2003/0031266 A1 Feb. 13, 2003

Related U.S. Application Data

(63) Continuation of application No. 09/156,066, filed on Sep. 17, 1998, now Pat. No. 6,459,740.

(51) Int. Cl.[7] ................... H04L 27/04; H04L 27/12; H04L 27/20
(52) U.S. Cl. ................ 375/299; 375/267; 375/347; 455/101
(58) Field of Search .................. 375/299, 347, 375/224, 259, 260, 267, 285, 295, 316, 346, 349; 455/303, 63, 101

(56) References Cited

U.S. PATENT DOCUMENTS

| | | | | |
|---|---|---|---|---|
| 5,369,412 A | * | 11/1994 | Tsujimoto | 342/380 |
| 5,487,091 A | * | 1/1996 | Jasper et al. | 375/347 |
| 5,819,168 A | * | 10/1998 | Golden et al. | 455/303 |
| 5,819,169 A | * | 10/1998 | Fudem | 455/326 |
| 5,949,833 A | * | 9/1999 | Weerackody | 375/347 |
| 5,966,095 A | * | 10/1999 | Hiramatsu et al. | 342/383 |
| 6,088,408 A | * | 7/2000 | Calderbank et al. | 375/347 |
| 6,307,851 B1 | * | 10/2001 | Jung et al. | 370/342 |

OTHER PUBLICATIONS

A. Wittneben (Basestation modulation diversity for digital SIMULCAST, IEEE 1991,p.p. 848–853).*

(List continued on next page.)

*Primary Examiner*—Jean B. Corrielus
(74) *Attorney, Agent, or Firm*—Perkins Coie LLP (57) ABSTRACT

An arrangement where a transmitter has a plurality of transmitting antennas that concurrently transmit the same symbol, and where the signal delivered to each transmitting antenna is weighted by a factor that is related to the channel transmission coefficients found between the transmitting antenna and receiving antennas. In the case of a plurality of transmit antennas and one receive antenna, where the channel coefficient between the receive antenna and a transmit antenna $i$ is $h_i$, the weighting factor is $h_i^*$ divided by a normalizing factor, $\alpha$, which is $$\left(\sum_{k=1}^{K} |h_k|^2\right)^{1/2},$$

where K is the number of transmitting antennas. When more than one receiving antenna is employed, the weighting factor is $$\frac{1}{\alpha}(gH)^H,$$

where $g=[g_1 \ldots g_L]$, H is a matrix of channel coefficients, and $\alpha$ is a normalizing factor $$\left(\sum_{p=1}^{L}\sum_{q=1}^{L}\left|\sum_{k=1}^{K} h_{pk} h_{qk}^*\right|\right)^{1/2}.$$

24 Claims, 3 Drawing Sheets

OTHER PUBLICATIONS

A. Wittneben (A New bandwidth Efficient Transmit Antena Madulation Diversity Scheme For Linear Digital Modulation, IEEE 1993, p.p. 1630–1634).*

A. Wittneben, "Basestation modulation diversity for digital SIMULCAST," 41$^{st}$ IEEE Vehicular Technology Conference, May 19–22, 1991, St. Louis, MO.

N. Seshadri and Jack H. Winters, "Two Signalling Schemes for Improving the Error Performance for Frequency–Division Duplex (FDD) Transmission Systems Using Transmitter Antenna Diversity," 43$^{rd}$ IEEE Vehicular Technology Conference, May 18–20, 1993, Seacaucus, NJ.

A. Wittneben, "A New Bandwidth Efficient Transmit Antenna Modulation Diversity Scheme for Linear Digital Modulation," IEEE International Conference on Communications, May 23–26, 1993, Geneva, Switzerland.

Jack H. Winters,"The Diversity Gain of Transmit Diversity in Wireless Systems with Rayleigh Fading," IEEE International Conference on Communications, May 1–5, 1995, New Orleans, La.

Siavash Alamouti, "A Simple Transmit Diversity Technique for Wireless Communications," *IEEE Journal on Select Areas in Communications*, vol. 16, No. 8, Oct. 18, 1998, pp. 1451–1458.

* cited by examiner

MAXIMUM RATIO TRANSMISSION

CROSS REFERENCE TO RELATED APPLICATIONS

This application is a continuation of U.S. patent application Ser. No. 09/156,066 now Pat. No. 6,459,740 filed an Sep. 17,1998, incorporated herein in its entirety by reference.

BACKGROUND OF THE INVENTION

Wireless communications services are provided in different forms. For example, in satellite mobile communications, communications links are provided by satellite to mobile users. In land mobile communications, communications channels are provided by base stations to the mobile users. In PCS, communications are carried out in microcell or picocell environments, including outdoors and indoors. Regardless the forms they are in, wireless telecommunication services are provided through radio links, where information such as voice and data is transmitted via modulated electromagnetic waves. That is, regardless of their forms, all wireless communications services are subjected to vagaries of the propagation environments.

The most adverse propagation effect from which wireless communications systems suffer is the multipath fading. Multipath fading, which is usually caused by the destructive superposition of multipath signals reflected from various types of objects in the propagation environments, creates errors in digital transmission. One of the common methods used by wireless communications engineers to combat multipath fading is the antenna diversity technique, where two or more antennas at the receiver and/or transmitter are so separated in space or polarization that their fading envelopes are de-correlated. If the probability of the signal at one antenna being below a certain level is p (the outage probability), then the probability of the signals from L identical antennas all being below that level is $p^L$. Thus, since p<1, combining the signals from several antennas reduces the outage probability of the system. The essential condition for antenna diversity schemes to be effective is that sufficient de-correlation of the fading envelopes be attained.

A classical combining technique is the maximum-ratio combining (MRC) where the signals from received antenna elements are weighted such that the signal-to-noise ratio (SNR) of the their sum is maximized. The MRC technique has been shown to be optimum if diversity branch signals are mutually uncorrelated and follow a Rayleigh distribution. However, the MRC technique has so far been used exclusively for receiving applications. As there are more and more emerging wireless services, more and more applications may require diversity at the transmitter or at both transmitter and receiver to combat severe fading effects. As a result, the interest in transmit diversity has gradually been intensified. Various transmit diversity techniques have been proposed but these transmit diversity techniques were built on objectives other than to maximize the SNR. Consequently, they are sub-optimum in terms of SNR performance.

SUMMARY

Improved performance is achieved with an arrangement where the transmitter has a plurality of transmitting antennas that concurrently transmit the same symbol, and where the signal delivered to each transmitting antenna is weighted by a factor that is related to the channel transmission coefficients found between the transmitting antenna and receiving antenna(s). In the case of a plurality of transmit antennas and one receive antenna, where the channel coefficient between the receive antenna and a transmit antenna i is $h_i$, the weighting factor is $h_i^*$ divided by a normalizing factor, $\alpha$, which is $$\left(\sum_{k=1}^{K} |h_k|^2\right)^{1/2},$$

where K is the number of transmitting antennas. When more than one receiving antenna is employed, the weighting factor is $$\frac{1}{\alpha}(gH)^H,$$

where $g=[g_1 \ldots g_L]$, H is a matrix of channel coefficients, and $\alpha$ is a normalizing factor $$\left(\sum_{p=1}^{L}\sum_{q=1}^{L}\left|\sum_{k=1}^{K} h_{pk} h_{qk}^*\right|\right)^{1/2}.$$

DETAILED DESCRIPTION

Figure 1:
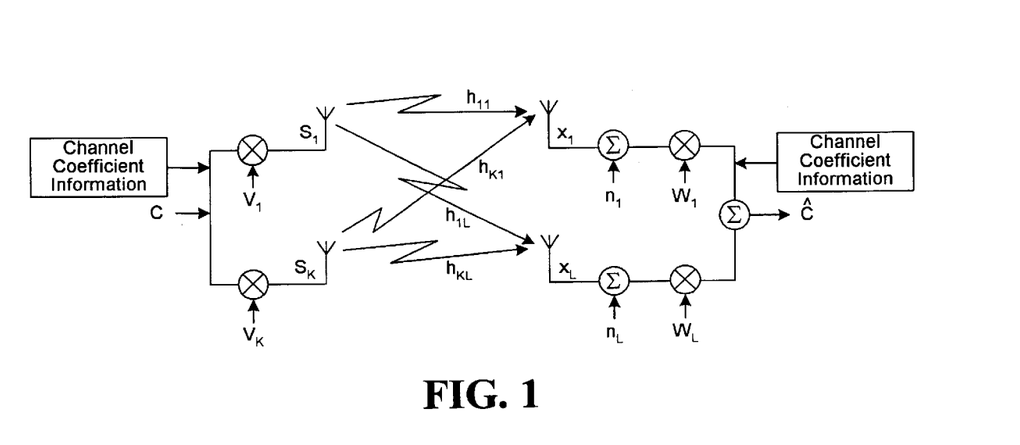
FIG. 1 illustrates an arrangement where there is both transmit and receive diversity.
Figure 2:
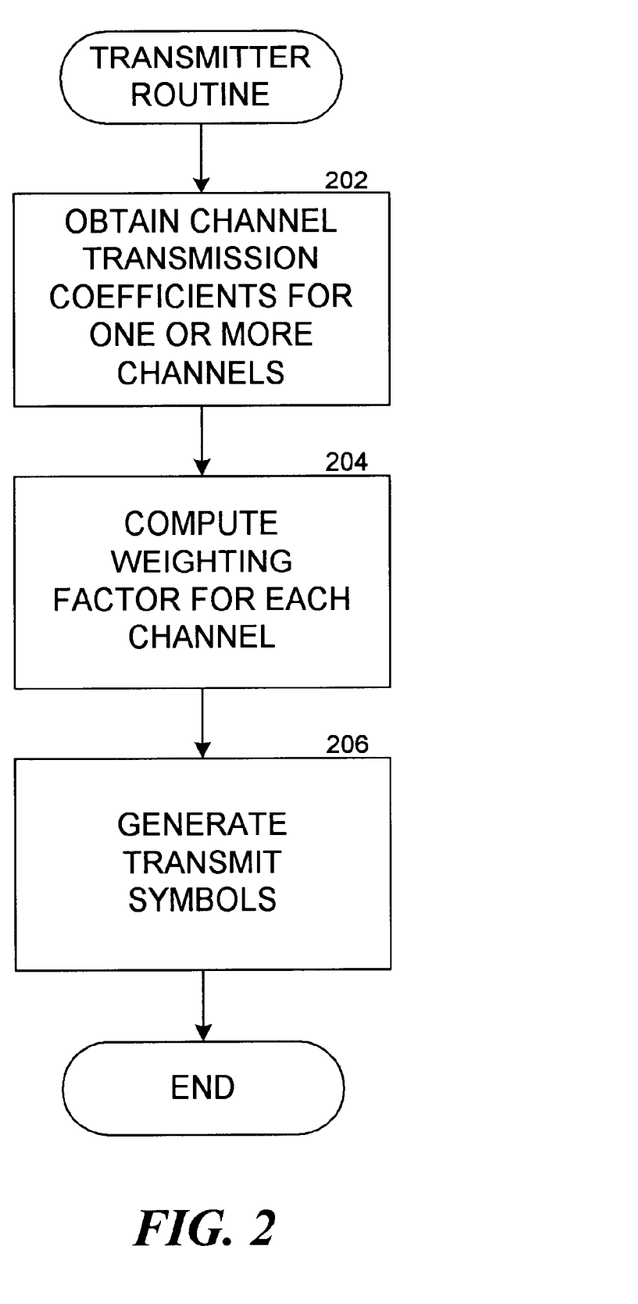
FIG. 2 is a flow chart illustrating a routine performed at the transmitter of FIG. 1.
Figure 3:
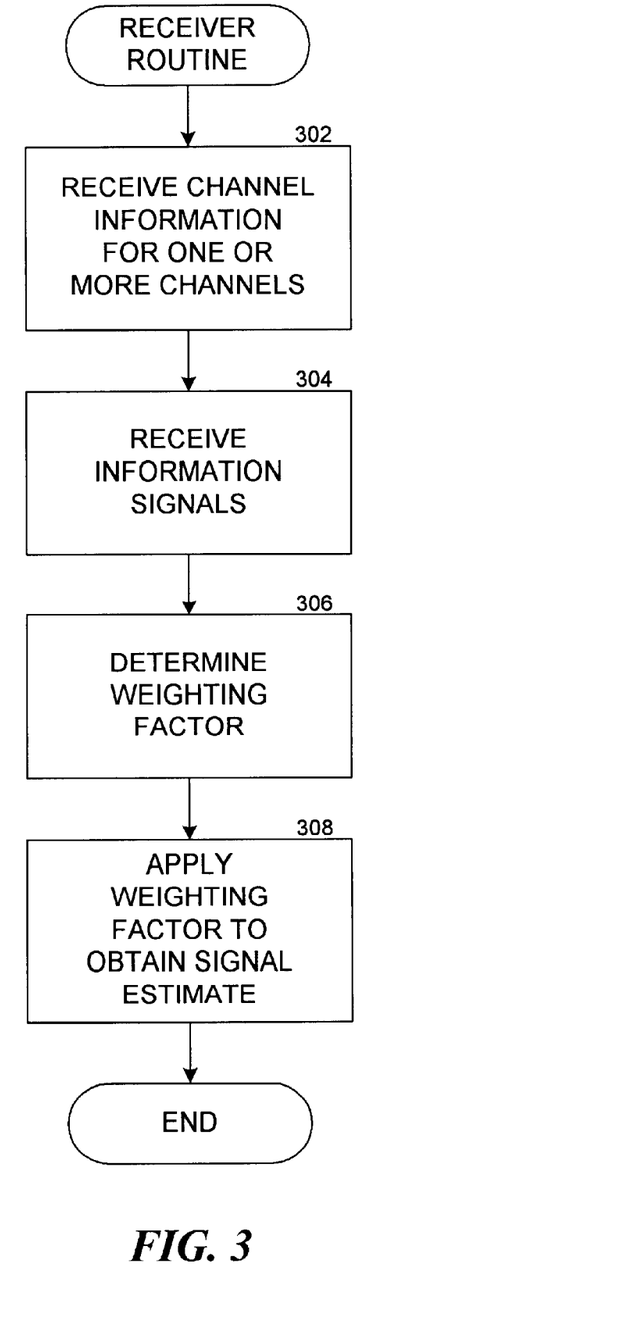
FIG. 3 is a flow chart illustrating a routine performed at the receiver of FIG. 1.

FIG. 1 depicts a system which comprises K antennas for transmission and L antennas for reception. The channel between the transmit antennas and the receive antennas can be modeled by K×L statistically independent coefficients, as shown in FIG. 1. It can conveniently be represented in matrix notation by $$H = \begin{bmatrix} h_{11} & \cdots & h_{1K} \\ \vdots & \ddots & \vdots \\ h_{L1} & \cdots & h_{LK} \end{bmatrix} = \begin{bmatrix} h_1 \\ \vdots \\ h_L \end{bmatrix} \quad (1)$$

where the entry $h_{pk}$ represents the coefficient for the channel between transmit antenna k and receiver antenna p. It is assumed that the channel coefficients are available to both the transmitter and receiver through some means, such as through a training session that employs pilot signals sent individually through each transmitting antenna (see block 202 of FIG. 2 and block 302 of FIG. 3). Since obtaining these coefficients is well known and does not form a part of this invention, additional exposition of the process of obtaining the coefficients is deemed not necessary.

The system model shown in FIG. 1, and also in the routines of FIG. 2 and FIG. 3, is a simple baseband representation. The symbol c to be transmitted is weighted with a transmit weighting vector v to form the transmitted signal vector. The received signal vector, x, is the product of the transmitted signal vector and the channel plus the noise. That is, $$x = Hs + n \quad (2)$$

where the transmitted signals s is given by $$s = [s_1 \ldots s_k]^T = c[v_1 \ldots v_k]^T, \quad (3)$$

the channel is represented by $$H=[h_1 \ldots h_k], \quad (4)$$

and the noise signal is expressed as $$n=[n_1 \ldots n_k]^T. \quad (5)$$

The received signals are weighted and summed to produce an estimate, $\hat{c}$, of the transmitted symbol c.

In accordance with the principles of this invention and as illustrated in block 204 of FIG. 2, the transmit weighting factor, v, is set to . . .

$$v = \frac{1}{a}[h_1 \ldots h_k]^H \quad (6)$$

where the superscript H designates the Hermitian operator, and a is a normalization factor given by $$a = \left( \sum_{k=1}^{K} |h_k|^2 \right)^{1/2} \quad (7)$$

is included in the denominator when it is desired to insure that the transmitter outputs the same amount of power regardless of the number of transmitting antennas. Thus, the transmitted signal vector (block 206 of FIG. 2) is . . .

$$s = cv = \frac{c}{a}[h_1 \ldots h_k]^H \quad (8)$$

and the signal received at one antenna is $$x = Hs + n = ac + n, \quad (9)$$

from which the symbol can be estimated with the SNR of $$\gamma = a^2 \frac{\sigma_c^2}{\sigma_n^2} = a^2 \gamma_0 \quad (10)$$

where $\gamma_0$ denotes the average SNR for the case of a single transmitting antenna (i.e., without diversity). Thus, the gain in the instantaneous SNR is $a^2$ when using multiple transmitting antennas rather than a single transmitting antenna.

The expected value of $\gamma$ is $$\bar{\gamma} = E[a^2]\gamma_0 = KE[|h_k|^2]\gamma_0 \quad (11)$$

and, hence, the SNR with a $K^{th}$-order transmitting diversity is exactly the same as that with a $K^{th}$-order receiving diversity.

When more than one receiving antenna is employed, the weighting factor, v, is $$v = \frac{1}{a}(gH)^H \quad (12)$$

". . . where $g=[g_1 \ldots g_L]$ (see block 204 of FIG. 2)."

$$s = \frac{c}{a}(gh)^H. \quad (13)$$

The normalization factor, a, is $|gH|$, which yields $$a = \left( \sum_{p=1}^{L} \sum_{q=1}^{L} g_p g_q^* \sum_{k=1}^{K} h_{pk} h_{qk}^* \right)^{1/2} \quad (14)$$

The received signal vector (block 304 of FIG. 3), is therefore, given by . . .

$$x = \frac{c}{a}H(gH)^H + n. \quad (15)$$

When the receiver's weighting factor, w, is set to be g (see blocks 306 and 308 of FIG. 3), the estimate of the received symbol . . .

$$\tilde{c} = gx = \frac{c}{a}gH(gh)^H + gn = ac + gn \quad (16)$$

with the overall SNR given by $$\gamma = \frac{a^2}{gg^H}\gamma_0 = \frac{a^2 \gamma_0}{\sum_{p=1}^{L} |g_p|^2}. \quad (17)$$

From equation (17), it can be observed that the overall SNR is a function of g. Thus, it is possible to maximize the SNR by choosing the appropriate values for g. Since the $h_{qk}$ terms are assumed to be statistically identical, the condition that $|g_1|=|g_2|=\ldots=|g_L|$ has to be satisfied for the maximum value of SNR. Without changing the nature of the problem, one can set $|g_p|=1$ for simplicity. Therefore the overall SNR is $$\gamma = \frac{a^2}{L}\gamma_0 \quad (18)$$

To maximize $\gamma$ is equivalent to maximizing a, which is maximized if $$(g_p g_q^*) = \frac{\sum_{k=1}^{K} h_{pk} h_{qk}^*}{\left| \sum_{k=1}^{K} h_{pk} h_{qk}^* \right|}. \quad (19)$$

Therefore, $$a = \left( \sum_{p=1}^{L} \sum_{q=1}^{L} \left| \sum_{k=1}^{K} h_{pk} h_{qk}^* \right| \right)^{1/2} \quad (20)$$

which results in the maximum value of $\gamma$. It is clear that the gain in SNR is $$\frac{a^2}{L}$$

when multiple transmitting and receiving antennas are used, as compared to using a single antenna on the transmitting side, or the receiving side.

The vector g is determined (block 306 of FIG. 3) by solving the simultaneous equations represented by equation (19).

$$(g_1 g_2^*) = \frac{\sum_{k=1}^{K} h_{1k} h_{2k}^*}{\left|\sum_{k=1}^{K} h_{1k} h_{3k}^*\right|}, (g_1 g_3^*) = \frac{\sum_{k=1}^{K} h_{1k} h_{3k}^*}{\left|\sum_{k=1}^{K} h_{1k} h_{3k}^*\right|}, \text{ and} \quad (21)$$

$$(g_2 g_3^*) = \frac{\sum_{k=1}^{K} h_{2k} h_{3k}^*}{\left|\sum_{k=1}^{K} h_{2k} h_{3k}^*\right|}.$$

All of the $h_{pg}$ coefficients are known, so the three equations form a set of three equations and three unknowns, allowing a simple derivation of the $g_1$, $g_2$, and $g_3$ coefficients. The corresponding average SNR is given by $$\bar{\gamma} = E[a^2]\frac{\gamma_0}{L} \quad (22)$$

where the value of $E[a^2]$ depends on the channel characteristics and, in general, is bounded by $$LKE[|h_k|^2] \leq E[a^2] \leq \beta L^2 KE[|h_k|^2].$$

I claim:

1. An arrangement comprising: K multipliers, each responsive to a symbol to be transmitted and to a distinct weighting factor; and K transmitting antenna, where transmitting antenna i is coupled to multiplier i of said K multipliers; where K is an integer greater than one, and the weighting factor for multiplier i is proportional to $h^i$, where $h^i$ is the complex conjugate of hi, and hi is a channel transfer coefficient between transmitting antenna i and an antenna of a receiver.

2. The arrangement of claim 1 where said weighting factor for multiplier i is $^a$, $$\frac{h_i^*}{a},$$

where $$a = \left(\sum_{k=1}^{K} |h_k|^2\right)^{1/2}.$$

3. In a closed loop system for wireless communication, the system comprising in part a transmitter apparatus and a receiver apparatus, wherein the receiver apparatus has one or more receiving antennas, the transmitter apparatus comprising:

two or more transmitting antennas;

two or more multipliers, each one of the two or more multipliers being responsive to a symbol to be transmitted and to a distinct weighting factor, wherein the distinct weighting factor is a linear transformation of a channel condition between one of the two or more transmitting antennas and one of the one or more receiving antennas of the receiver apparatus, and wherein each one of the two or more multipliers is coupled to a corresponding one of the two or more transmitting antennas; and wherein the weighting factor for each one of the two or more multipliers is related to a complex conjugate of a channel transfer coefficient between the corresponding one of the two or more transmitting antennas and the one of the one or more receiving antennas of the receiver apparatus.

4. The transmitter apparatus of claim 3 wherein the weighting factor is divided by a normalizing factor, and wherein the normalizing factor depends in part upon the number of transmitting antennas.

5. The transmitter apparatus of claim 3 wherein the receiver apparatus includes two or more antennas, and the weighting factor is a linear transformation of a channel condition between each one of the two or more transmitting antennas and one of the two or more receiving antennas of the receiver apparatus.

6. In a closed loop system for wireless communication, the system comprising in part a transmitter apparatus and a receiver apparatus, the transmitter apparatus comprising:

two or more transmitting antennas;

two or more multipliers, each one of the two or more multipliers responsive to a symbol to be transmitted and to a distinct weighting factor, wherein each one of the two or more multipliers is coupled to a corresponding one of the two or more transmitting antennas; and wherein the weighting factor for each one the two or more multipliers is related to a complex conjugate of a channel transfer coefficient between the corresponding one of the two or more transmitting antennas and an antenna of the receiver apparatus.

7. The transmitter apparatus of claim 6 wherein the weighting factor is divided by a normalizing factor, and wherein the normalizing factor depends in part upon the number of transmitting antennas.

8. The transmitter apparatus of claim 6 wherein the receiver apparatus includes two or more antennas, and the weighting factor is a linear transformation of a channel condition between each one of the two or more transmitting antennas and one of the two or more receiving antennas of the receiver apparatus.

9. In a closed loop system for wireless communication, the system comprising in part a transmitter apparatus and a receiver apparatus, the receiver apparatus comprising:

one or more receiver antennas;

one or more multipliers, each one of the one or more multipliers coupled to a corresponding one of the one or more receiver antennas and multiplying a signal received from the coupled receiver antenna by a weighting factor; and wherein the weighting factor is a vector associated with one or more channel transfer coefficients between one of multiple transmit antennas and each of the one or more receiver antennas, and wherein the vector also represents a correlation vector between multiple channels associated with the one or more channel transfer coefficients.

10. A transmit apparatus for use in a closed-loop wireless communication system, wherein the wireless communication system includes a receive apparatus having at least a first receive antenna for receiving communications over channels from the transmit apparatus, the transmit apparatus comprising:

a transmit portion having at least first and second transmit antennas coupled respectively to first and second multipliers; and at least one channel coefficient portion configured to obtain channel coefficient information representing the channels, wherein the channel coefficient information includes a first channel coefficient associated with a first channel between the first transmit antenna and the first receive antenna and a second channel coefficient associated with a second channel between the second transmit antenna and the first receive antenna; and wherein the transmit portion is further configured to:
receive the first and second channel transmission coefficients;
compute first and second weighting factors based on the received first and second channel transmission coefficients;
multiply an input symbol by the first and second weighting factors to produce, via the first multiplier, a first transmit symbol representing the input symbol multiplied by the first weighting factor, and produce, via the second multiplier, a second transmit symbol representing the input symbol multiplied by the second weighting factor; and
transmit the first and second transmit symbols via the first and second transmit antennas, respectively.

11. The transmit apparatus of claim 10 wherein the receive apparatus includes a second receive antenna, and
wherein the obtained channel coefficient information includes a third channel coefficient associated with a third channel between the first transmit antenna and the second receive antenna and fourth channel coefficient associated with a fourth channel between the second transmit antenna and the second receive antenna; and
wherein the transmit portion is further configured to:
receive the third and fourth channel transmission coefficients;
compute third and fourth weighting factors based on the received third and fourth channel transmission coefficients; and
multiply the input symbol by the third and fourth weighting factors.

12. The transmit apparatus of claim 10 wherein the first and second weighting factors are divided by a normalizing factor, and wherein the normalizing factor depends in part upon the number of transmitting antennas.

13. The transmit apparatus of claim 10 wherein the first and second weighting factors are complex conjugates of the first and second channel transmission coefficients.

14. The transmit apparatus of claim 10 wherein the first and second multipliers are distinct.

15. In a closed-loop wireless communication system, wherein the wireless communication system includes a receive apparatus having at least a first receive antenna for receiving communications over channels from a transmit apparatus, a method of transmitting information comprising:
obtaining channel coefficient information including a first channel coefficient associated with a first channel between the first transmit antenna and the first receive antenna and a second channel coefficient associated with a second channel between the second transmit antenna and the first receive antenna;
determining first and second weighting factors based on the first and second channel transmission coefficients;
multiplying an input symbol by the first and second weighting factors to produce a first transmit symbol representing the input symbol multiplied by the first weighting factor, and a second transmit symbol representing the input symbol multiplied by the second weighting factor; and
transmitting the first and second transmit symbols via the first and second transmit antennas, respectively.

16. The method of claim 15 wherein the receive apparatus includes a second receive antenna, and
wherein the obtained channel coefficient information includes a third channel coefficient associated with a third channel between the first transmit antenna and the second receive antenna and fourth channel coefficient associated with a fourth channel between the second transmit antenna and the second receive antenna; and;
wherein the multiplying includes multiplying the input symbol by weighting factors representing the first, second, third and fourth channel transmission coefficients.

17. The method of claim 16 wherein the first and second weighting factors are divided by a normalizing factor, and wherein the normalizing factor depends in part upon the number of transmitting antennas.

18. The method of claim 16 wherein the first and second weighting factors are complex conjugates of the first and second channel transmission coefficients.

19. In a system for wireless communication, the system comprising in part a transmitter apparatus and a receiver apparatus, wherein the transmitter apparatus includes at least first and second transmit antennas, a method of receiving information, comprising:
receiving channel information including information regarding a first channel between the first transmit antenna and a first receive antenna, and a second channel associated with the second transmit antenna and the first receive antenna;
receiving at least first and second information signals at the first receive antenna, wherein the first and second information signals represent an input symbol multiplied by first and second transmit weighting factors, wherein the first and second weighting factors relate to the provided channel information;
determining at least one channel weighting factor based on the channel information;
multiplying the first and second information signals by the at least one weighting factor; and
summing the multiplied first and second information signals to obtain an estimate of the input symbol.

20. The method of claim 19 further comprising: obtaining information regarding a third channel between the first transmit antenna
and a second receive antenna, and a fourth channel associated with the
second transmit antenna and the second receive antenna;
determining at least one other channel weighting factor based on the channel
information; and multiplying at least one of the first and second information signals by the at least
one other channel weighting factor.

21. The method of claim 19 wherein the at least one channel weighting factor is a complex conjugate of a channel transmission coefficient.

22. In a system for wireless communication, the system comprising in part a transmitter apparatus and a receiver apparatus, wherein the transmitter apparatus includes at least first and second transmit antennas, a receiver apparatus, comprising:
means for obtaining channel information including information regarding a first channel between the first transmit antenna and a first receive antenna, and a second channel associated with the second transmit antenna and the first receive antenna;

means for receiving at least first and second information signals at the first receive antenna, wherein the first and second information signals represent an input symbol multiplied by first and second transmit weighting factors, wherein the first and second weighting factors relate to the provided channel information;

means for determining at least one channel weighting, factor based on the received channel information;

means, coupled to the means for providing and the means for receiving, for multiplying the first and second information signals by the at least one channel weighting factor; and means, coupled to the means for multiplying, for summing the multiplied first and second information signals to obtain an estimate of the input symbol.

23. The apparatus of claim 22 wherein:

the means for obtaining includes means for obtaining information regarding a third channel between the first transmit antenna and a second receive antenna, and a fourth channel associated with the second transmit antenna and the second receive antenna;

the means for determining includes means for determining at least one other channel weighting factor based on the channel information; and the means for multiplying includes means for multiplying at last one of the first and second information signals by the at least one other weighting factor.

24. The apparatus of claim 22 wherein the at least one channel weighting factor is a complex conjugate of a channel transmission coefficient.

* * * * *

UNITED STATES PATENT AND TRADEMARK OFFICE
CERTIFICATE OF CORRECTION

PATENT NO.   : 6,826,236 B2
DATED        : November 30, 2004
INVENTOR(S)  : Titus Lo It is certified that error appears in the above-identified patent and that said Letters Patent is hereby corrected as shown below:

Column 10,
Line 11, "last" should be -- least --;

Signed and Sealed this

Twenty-eighth Day of June, 2005

JON W. DUDAS
*Director of the United States Patent and Trademark Office*